United States Patent

[11] 3,618,562

| [72] | Inventor | Virgil Erbert<br>Albuquerque, N. Mex. |
|---|---|---|
| [21] | Appl. No. | 44,743 |
| [22] | Filed | June 9, 1970 |
| [45] | Patented | Nov. 9, 1971 |
| [73] | Assignee | Rolamite, Incorporated<br>San Francisco, Calif. |

[54] PIVOTAL MOUNTING
16 Claims, 6 Drawing Figs.

[52] U.S. Cl. ..................................................... 116/136.5,
16/171, 29/505, 40/39, 324/154
[51] Int. Cl. ......................................................... G01d 13/22
[50] Field of Search ........................................... 116/136.5,
133, 129; 16/171; 324/154, 155, 158; 29/505;
40/39

[56] References Cited
UNITED STATES PATENTS

| 808,766 | 1/1906 | Lehmann | 116/171 UX |
|---|---|---|---|
| 2,810,223 | 10/1957 | Fraesdorf, Jr. | 40/39 |
| 3,015,951 | 1/1962 | Ochs, Jr. | 116/136.5 X |
| 3,090,142 | 5/1963 | Anderson | 40/39 |

*Primary Examiner*—Louis J. Capozi
*Attorney*—Burns, Doane, Benedict, Swecker & Mathis

ABSTRACT: A pointer mounting arrangement including a support formed from a thin resilient sheet member pivotally connected with a thin sheet pointer member. The thin sheet pointer is provided with an aperture or notches in a portion thereof for pivotal connection with corresponding portions in the thin sheet support member to provide a sensitive, accurate, rugged, inexpensive and easily manufactured precision mounting arrangement.

PATENTED NOV 9 1971

INVENTOR
VIRGIL ERBERT

BY Burns, Doane, Benedict,
Swecker & Mathis
ATTORNEYS

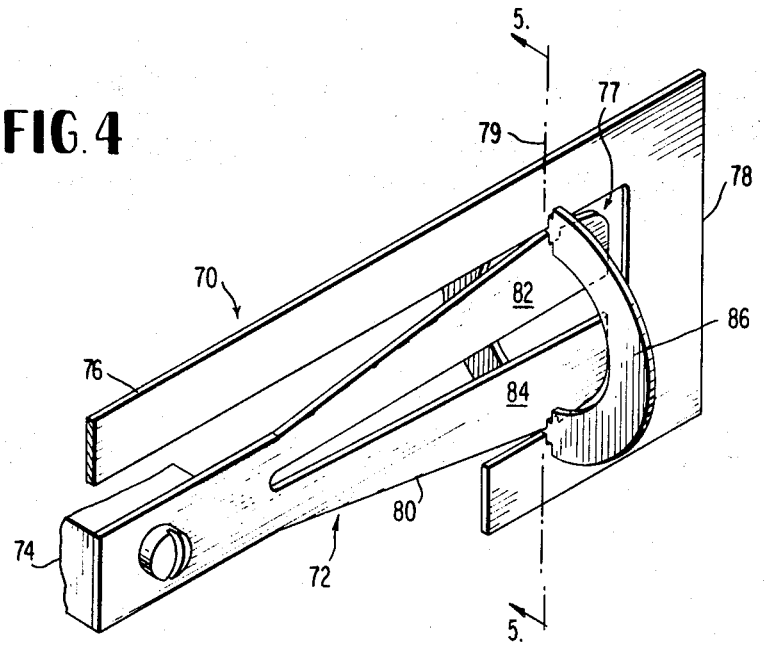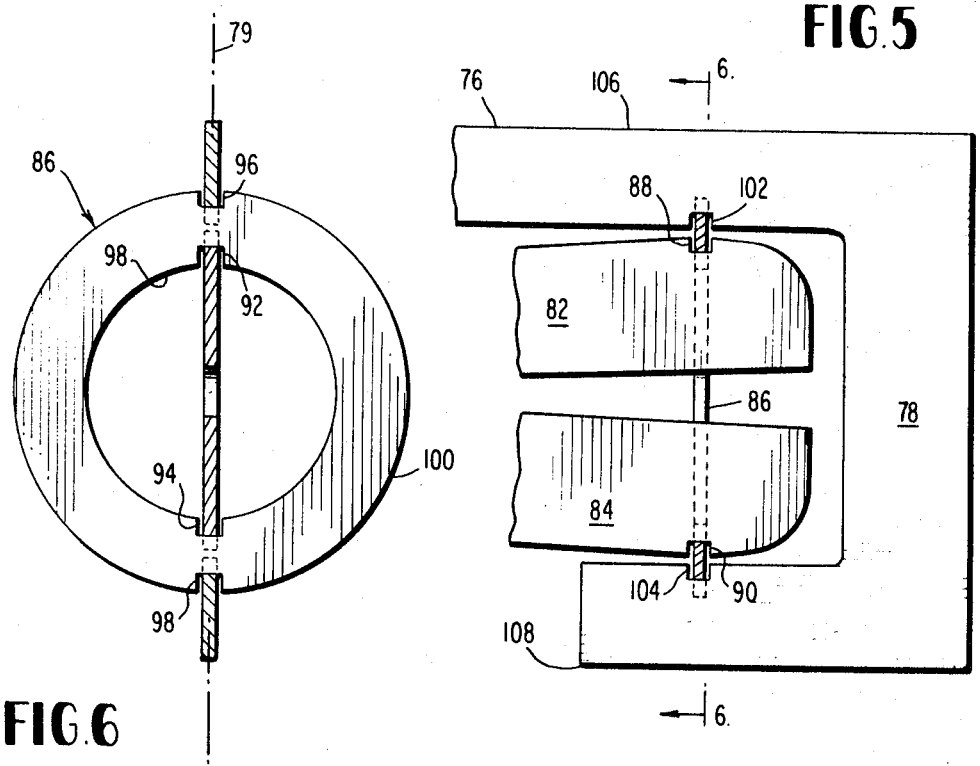

PIVOTAL MOUNTING

BACKGROUND OF THE INVENTION

This invention relates to frictionless pivotal bearing arrangements suitable for use in a multiplicity of specific applications. More particularly, this invention relates to an improved mounting arrangement for use with sensitive meter indicators.

Meter indicators such as, for example, a simple D'Arsonval type for measurement of current or voltage, ohmmeters and volt-ohm-milliampmeters and vacuum tube voltmeters are useful as static or steady-state dynamic indicators. Further, stylus oscillographs and the like, the heart of which is typically a D'Arsonval movement, are useful for dynamic measurement. Both of these types of instruments rely upon an ability to deflect a pointer arm about a pivotal mounting in response to an often feeble electrical signal. Typical performance criteria for such instruments are sensitivity, or the amount of current required to produce full-scale deflection; precision, or the repeatability of measurement of a fixed quantity; and accuracy, or the measurement of the true value of the quantity being measured.

In such measuring equipment it will thereby be realized that an essentially frictionless mounting between the pointer arm and a pivotal support is desirable to achieve a maximum performance rating of sensitivity, precision and accuracy.

In addition to the above noted criteria, meters that are used in off-highway equipment, for example, must be rugged and have the ability to withstand high shock and vibration without changing characteristics.

At least one previously known design for pivotally mounting or supporting a pointer or indicator arm comprises a structure having a shaft with cone-pointed ends fitting into cone-shaped depressions of very hard material. While such a structure if accurately fabricated is satisfactory, it will be appreciated that inaccuracies in axial length of the shaft will produce a binding action or side play which materially affects meter readings. Moreover, variations in the ambient temperature may effect the parts of such a pivot mounting to change the adjustment and produce faulty readings.

Other moving bearing arrangements such as the ordinary sleeve-type bearing exhibits a high friction loading; jewel bearings though quite frictionless are relatively expensive to fabricate and accurately align; and ball or roller bearings are affected by dust and dirt which inevitably gathers therein during use. Moreover, these previous mountings all require assembling large number of often delicate and accurately dimensioned parts. Such assembly is necessarily costly and time-consuming. Further, a large number of parts and complexity of interaction creates the very real potential for errors during assembly and subsequent failure.

In addition, the shock and vibration susceptibility of a meter movement is directly related to the mass of the moving assembly. Consequently, the requirements on the suspension system are affected to a large extent by the mass of the moving assembly.

Thus, while previously known support arrangements have been generally satisfactory in the past, room for significant improvement remains.

More specifically, it would be desirable to provide a pointer arm and mounting arrangement which would exhibit a high degree of sensitivity, precision, and accuracy, yet minimize the complexity of the mounting arrangement. Additionally, it would be desirable to provide a mounting assembly with a minimum number of parts which could be rapidly and accurately fabricated and assembled by unskilled workmen. Further, it would be desirable to minimize sliding frictional forces between the rotatable meter arm and the relatively stationary mounting element, so that relatively long life performance may be expected. Moreover it would be desirable to minimize the mass of the moving assembly and maximize the ability of the mounting assembly to withstand shock and vibration.

OBJECTS AND SUMMARY OF THE INVENTION

It is therefore a general object of the invention to provide a mounting arrangement which is designed to obviate or minimize deficiencies of conventional mountings, as previously described.

It is a particular object of the invention to provide a meter mounting which is light in weight and sensitive, thus minimizing inertia problems, and yet is easily and accurately fabricated with a minimum amount of skilled labor.

It is a further object of the invention to provide a meter-mounting arrangement with minimizes friction between the movable indicator arm and the support member, so as to minimize wear and maintenance costs, while maximizing the sensitivity, precision and accuracy of an instrument utilizing the mounting arrangement.

It is yet another object of the invention to provide a balanced meter-mounting arrangement which retains the previously known sensitivity, precision and accuracy of mounting arrangements while simultaneously minimizing the number of parts and heightening the reliability of maintenance-free performance.

It is a still further object of the invention to provide a meter-mounting arrangement which is self-adjusting to maintain proper pivotal contact.

It is yet another object of the invention to provide a meter-mounting arrangement which is rugged and can withstand considerable shock and vibration without changing the meter characteristics.

One preferred embodiment of the invention intended to accomplish at least some of the foregoing objects comprises a pivotal pointer mounting including a thin sheet support member and a thin sheet pointer member. The pointer member has an elongated aperture along the pivot axis. The midportion of the aperture is offset toward the pivot axis and portions spaced longitudinally above and below the midportion are offset on the other side of the aperture toward the pivot axis. The thin sheet supporting member has integral parallel strips corresponding to the midportion and spaced portions of the pointer member aperture. The midportion of the aperture engages with the surface of the central support strip. Other strips on the support member engage the spaced portions of the aperture. Thus, the edges of the aperture engage the surfaces of the strips along lines parallel to the pivot axis and the connection for pivotal movement through approximately 180° about the pivot axis. Tabs projecting into the aperture from the pointer member are received in corresponding holes in the support strips. These tabs prevent displacement of the pointer member along the pivot axis or perpendicularly to the pivot axis.

An alternate preferred embodiment of the invention comprises a thin sheet support member in the form of a generally circular disc having a central opening with a cantilever mount and a thin sheet pointer member formed generally in a J-shape with a pointer arm and a base arm. The disc has notches spaced 180° apart on the peripheral edge of the disc. The notches of the support disc are received in opposed notches in the arms of the pointer member. The spacing between the notches in the pointer member is equal to or slightly greater than the spacing between the notches in the support disc. The support disc is similarly supported by the cantilever mounting sheet that is received in diametrically opposed notches in the central opening of the disc. The sides and the bottom of the notches restrict displacement along the pivot axis and in both orthogonal directions.

In both embodiments it will be appreciated that the pointer is constrained to pivotal oscillation about an axis spatially defined by the interaction of the thin sheet support and pointer members.

DESCRIPTION OF THE DRAWINGS

Further objects and advantages of the invention will become apparent from the following detailed description taken in conjunction with the accompanying drawings, wherein:

FIG. 4 is an isometric view of a pointer mounting comprising another preferred embodiment of the invention;

FIG. 5 is a sectional view of the pointer mounting taken along section line 5—5 in FIG. 4; and FIG. 6 is a sectional view of the pointer mounting taken along section line 6—6 in FIG. 5.

DETAILED DESCRIPTION OF PREFERRED EMBODIMENTS

Figure 1:
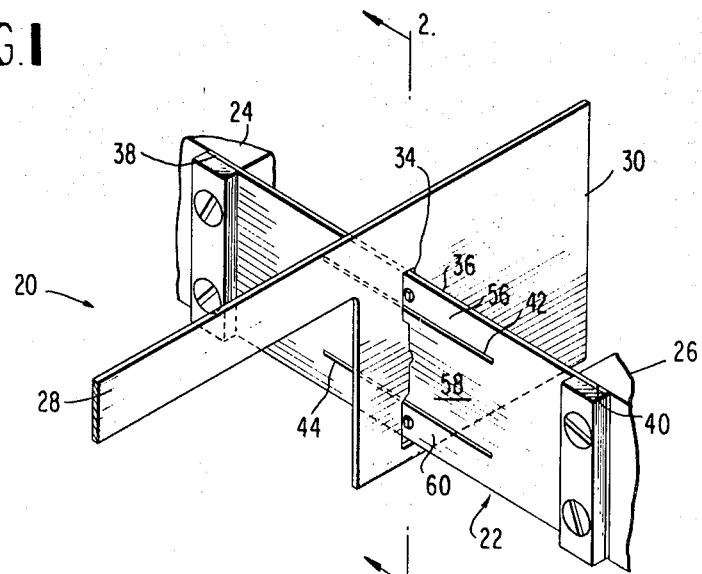
FIG. 1 is an isometric view of a pointer mounting according to a preferred embodiment of the invention.

Referring now to the drawings, and specifically to FIG. 1 thereof, there will be seen an isometric illustration of a preferred embodiment of a mounting arrangement according to the invention.

More specifically, the mounting arrangement is composed of essentially a thin sheet minimal mass pointer 20 and a thin sheet support 22. The support is mounted at its ends on suitable stationary surfaces indicated at 24 and 26.

The thin sheet pointer 20 includes an arm 28 which extends outwardly from an enlarged body portion 30. The body portion 30 is provided with an elongated aperture 34 extending generally along a central pivotal axis 32. The dimensions of the body 30 and arm 28 are such that the central pivotal axis 32 of the aperture 34 passes through the center of gravity of the pointer 20. Thus, the mass of the pointer 20 is balanced about the pivot and coincides with the center of percussion to provide an exceptional degree of immunity to shock and vibration.

The configuration of the body portion 30 is illustrated generally in the form of a rectangle which serves as an oscillation damper. It will be appreciated, however, by those skilled in the art that other configurations are contemplated which will perform a damping function and simultaneously conform with the interior dimensional requirements of a meter dial housing.

The support 22 is in the form of a generally rectangular thin sheet 36 that is materially flat and has end portions 38 and 40 for fixed connection to the surfaces 24 and 26, as by conventional fastening techniques, such as for example, threaded fasteners, spot welding, soldering, riveting or the like.

The sheet 36 is provided with an upper slit 42 and a lower slit 44 which form strips 56, 58 and 60 having opposed bearing surfaces 61 and 63 (note FIG. 2), for engagement with select portions of the bearing surfaces of the pointer aperture 34.

Figure 2:
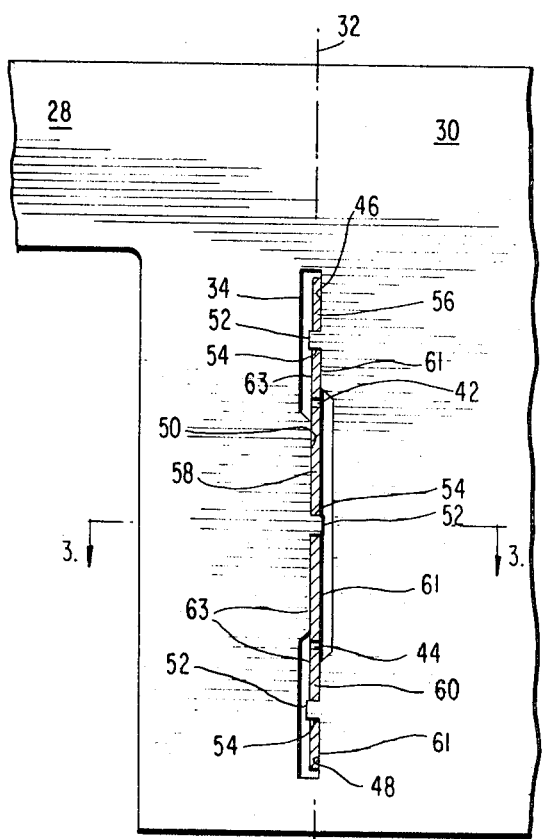
FIG. 2 is a sectional view of the pointer mounting taken along section line 2—2 in FIG. 1.
Figure 3:
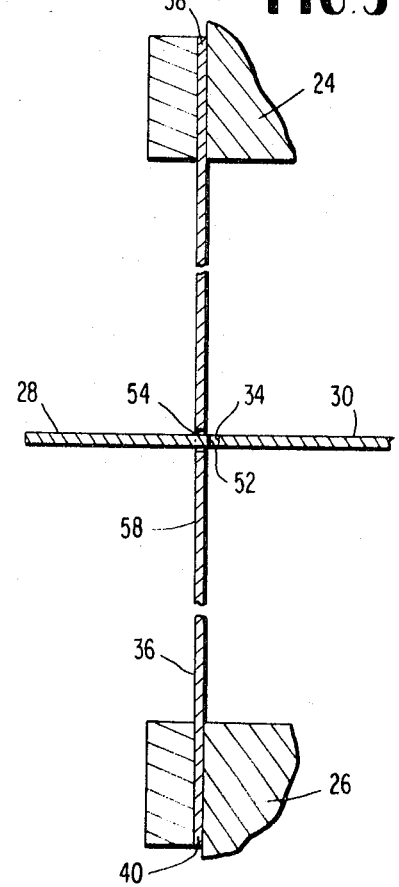
FIG. 3 is a sectional view of the pointer mounting taken along section line 3—3 in FIG. 2.

Referring specifically to FIGS. 2 and 3, there will be seen a segmental sectional view taken along line 2—2 of FIG. 1, and a segmental sectional view taken along line 3—3 in FIG. 2, respectively, disclosing the aperture positioned through the center of gravity of the pointer 20. More specifically, the aperture 34 comprises a generally rectangular slot having an upper and lower right-hand bearing surface or edge portions 46 and 48, respectively, forming a margin in the aperture 34. Between the upper and lower extending edges 46 and 48, respectively, is a centrally extending bearing surface or edge portion 50 extending from the left-hand side of the aperture 34.

The extensions 46, 48 and 50 are each provided with tabs 52 for internal engagement with apertures 54 in the support 22 in a manner which will be more fully discussed hereinafter.

The support 22, as previously mentioned, is provided with upper and lower slits 42 and 44, respectively, which divide the support sheet 36 into an upper strip 56, a central strip 58 and a lower strip 60, each having opposed bearing surfaces 61 and 63. The strips 56, 58 and 60 are each provided with a central aperture 54. Tabs 52 of the edge portions 46, 48 and 50 are received within the apertures 54 to prevent shifting of the pointer 20 upon the support 22. The pivot arm 28 is thus free to frictionlessly pivot about the axis 32, approximately 180°. The arc of oscillation of the pointer arm 28 is, of course, somewhat pivotally limited by the dimensioned tolerances selected between the tabs 52 and the apertures 54.

The dimensional relationship of the thickness of the support member 22 and the edge portions 46, 48 and 50 are such that edge portions 46, 48 and 50 contact but do not deflect the strips 56, 58 and 60 from a planar relationship in the normal supporting posture. It will be realized, however, that the strips may be displaced laterally from the normal plane to permit an initial rapid assembly operation by unskilled personnel.

Referring now to FIG. 4 there will be seen an isometric illustration of an alternate embodiment of the pointer mounting arrangement of the invention.

More specifically, a pointer 70 is mounted upon a support 72, which is fixedly connected to a stationary member 74.

The pointer 70 is composed of a longitudinally extending arm 76 and a U-shaped body 78, which in conjunction form a generally J-shaped pointer configuration. Like the pointer of the embodiment illustrated in FIG. 1, pointer 70 is composed of a thin sheet material, which will thus produce minimal inertia problems. The pointer 70 is suitably dimensioned so that the center of gravity and center of percussion thereof will lie within the body portion 78 and thus a balanced pivotal axis 79 may be formed within the body 78.

Connected within the internal portion 77 of the base of the pointer 78 is a support 72 comprising an inner bifurcated member 80, having upper and lower leaves 82 and 84, respectively, and a pivot disc or ring 86.

Referring to FIGS. 5 and 6, there will be seen alternate views of the embodiment specifically illustrated in FIG. 4, which more clearly illustrates the interrelationship of the support 72 and pointer 70.

The leaves 82 and 84 of the support are provided with axially aligned notches or bearing surfaces 88 and 90, which are received in notches or bearing surfaces 88 and 90, which are received in notches or bearing surfaces 92 and 94 in the inner perimeter 98 of the pivot ring or disc 86. Another pair of notches or bearing surfaces 96 and 98 is formed in the outer perimeter 100 of the pivot ring or disc 86. These notches 96 and 98 are received in corresponding notches or bearing surfaces 102 and 104, formed in the inner surface of the U-shaped body 78.

Referring to FIGS. 5 and 6, there will be seen alternate views of the embodiments specifically illustrated in FIG. 4, which more clearly illustrate the interrelationship of the support 72 and pointer 70.

The bottoms of the opposed notches 96 and 98 in the disc 86 cooperate with the notches 102 and 104 to restrict displacement of the body 78 relative to the disc 86 in a direction longitudinally of the pivot axis 79. The sides of the notches 96 and 98 engage the opposite faces of the body 78 to restrict its displacement relative to the disc in one orthogonal direction with respect to the pivot axis. The sides of the notches 102 and 104 engage the opposite faces of the disc 86 to restrict displacement of the body 78 relative to the disc 86 in the other orthogonal direction with respect to the pivot axis. Similarly, the notches interconnecting the leaves 82 and 84 with the disc 86 maintain these members in alignment with the pivot axis.

Although a single disc 86 is shown in the embodiment of FIGS. 4 to 6, another disc could be interposed between the disc 86 and the support member 80 to provide a greater arc of movement for the pointer 76. The second disc should have the same shape as the disc 86, but of a smaller size. The notches of the second disc would cooperate with the notches 92 and 94 of the disc 86 and with the notches 88 and 90 of the leaves 82 and 84.

It will be realized by those skilled in the art that the pivot disc 86 of the support 72 may pivot about the support member 80 approximately 180° while the pointer 70 may pivot about the pivot disc 86, approximately 180°, so that the potential pivotal movement of the pointer 70 with respect to the stationary member 74 comprises approximately 360°.

The previously disclosed embodiments of the novel pointer arrangement of the invention have been described as being formed of thin sheet material. This material typically may have a thickness ranging from 0.001 inch to 0.010 inch. When dealing with such tin sheet materials, it is no longer necessary to relay upon inaccurate punching fabrication or casting, but rather chemical photo etching techniques may be utilized to quickly and accurately fashion the dimensions required for a reliable pointer mounting arrangement. Materials that are suitable for the components of this pointer mounting arrangement include copper and copper alloys, stainless steel and other materials that are capable of being formed in thin sheets. Preferably, the material should be suitable for shaping by photographic and chemical techniques.

It will be appreciated by those skilled in the art that the above disclosed embodiments of the thin sheet mounting arrangement may be formed with a moving assembly of minimal mass, such as for example, 0.050 grams, and therefore shock, vibration and inertia problems are minimized. Further, the arrangement is composed of a minimum number of parts thus eliminating time-consuming accurate assembling operations.

It will further be appreciated that the above-disclosed pointer mounting mechanism provides a precision mounting which minimizes sliding friction between the pivotal pointer arm and the support so that longlasting reliable performance can be expected, of high sensitivity, precision and accuracy.

It will be further realized that the above-described mounting system is an extremely simplified structure which may be accurately fabricated by mass production techniques, this making the mounting system an economically attractive one. Further, the pointer arm is pivotally connected about its center of gravity and center of percussion and the system will be balanced throughout its movement.

Although the invention is described with reference to preferred embodiments, it will be appreciated by those skilled in the art that additions, deletions, modifications, substitutions and other changes not specifically described and illustrated in these embodiments may be made which will fall within the purview of the appended claims.

What is claimed is:

1. A pivotal joint construction comprising:
a pair of members formed of thin sheet material, said members including joint means holding said pair of members together for swinging relative to each other about a pivot axis;
said joint means including a first pair of opposed edges restricting displacement of said members relative to each other along said pivot axis, and including a second pair of opposed edges restricting displacement of said members relative to each other along one orthogonal axis with respect to said pivot axis, and including a third pair of opposed edges restricting displacement of said members relative to each other along the other orthogonal axis with respect to said pivot axis, whereby said first, second and third pairs of edges form a stable support for said members for pivoting movement about said axis.

2. The pivotal joint construction according to claim 1 wherein one of said members has an elongated slot, at least a portion of the other of said members extending through said slot, said second pair of edges being defined by the opposite edges of said slot.

3. The pivotal joint construction according to claim 1 wherein one of said members has notches aligned with said pivot axis, said second pair of edges being defined by opposed sides of said notches.

4. A pivotal pointer mounting comprising:
a thin sheet supporting means, said supporting means including at least one mounting portion for attachment to a relatively fixed member,
a thin sheet pointer member, and
connecting means on said pointer member and said supporting means, said connecting means interconnecting said pointer member and said supporting means for pivoting about an axis, whereby said member is pivotally interconnected with said thin sheet supporting means and is removably retained thereon by said connecting means.

5. A pivotal pointer mounting as defined in claim 4 wherein said support means further includes:
a thin sheet having at least one elongated slit therein, said at least one slit permitting a deflection of a portion of said thin sheet on one side of said slit relative to a portion of said thin sheet on the other side of said slit.

6. A pivotal pointer mounting as defined in claim 4 wherein said support means comprises:
a rectangular thin sheet having a pair of slits generally symmetrically fashioned therethrough and being mutually parallel and further generally parallel to opposite edges of said thin sheet, whereby the portion of said thin sheet intermediate the pair of slits may be displaced relative to the portions of said thin sheet between the slits and the said two edges of said thin sheet, said thin sheet positioned between said pair of slits having a central aperture therethrough generally centrally of said thin sheet.

7. A pivotal pointer mounting as defined in claim 6 and further wherein:
said portions of said thin sheet between the slits and the said two edges of said thin sheet being provided with apertures therethrough lying along an imaginary line intersecting the central aperture and drawn perpendicular to the edges of said parallel slits.

8. A pivotal pointer mounting as defined in claim 4 wherein said thin sheet pointer member comprises:
a body portion having an elongated aperture therein said aperture having a longitudinal axis and generally mutually spaced parallel first and second elongated edges, wherein at least one portion of said first edge being offset toward said axis edge, and at least one portion of said second edge being offset toward said axis.

9. A pivotal pointer mounting as defined in claim 8 and further comprising:
a tab protruding from at least one of said offset portions extending a distance toward the corresponding portion of an opposing edge but falling short of the corresponding portion of the opposing edge.

10. A pivotal pointer mounting as defined in claim 8 wherein:
said longitudinal axis intersects the center of gravity of said thin sheet pointer member.

11. A pivotal pointer mounting as defined in claim 4 wherein said support means further comprises:
a first thin sheet member having,
an outer edge portion with a pair of inwardly directed outwardly facing opposed notches within said outer edge portion, and
an inner edge portion within said outer edge portion with a pair of outwardly directed inwardly facing notches within said inner edge portion said notches being aligned, and said inwardly directed outwardly facing opposed notches being suitable for pivotal connection with said thin sheet pointer member; and
a second thin sheet member having a mounting portion and a bifurcated body portion including resilient cantilever leaves and an inwardly directed outwardly facing notch formed in the outer edge of each leaf for pivotal engagement with said pair of outwardly directed inwardly facing notches within the inner portion of said first thin sheet member.

12. A pivotal pointer mounting as defined in claim 11 wherein said first thin sheet member comprises:
a generally thin sheet circular disc with a concentric aperture formed therein.

13. A pivotal pointer mounting as defined in claim 4 wherein said thin sheet pointer member comprises:
a generally J-shaped thin sheet having a pair of outwardly directed inwardly facing opposed notches formed within the inner edge of the base of said J-shaped thin sheet.

14. A pivotal pointer mounting comprising:
a support means including,
a generally resilient thin sheet having a pair of slits generally symmetrically fashioned therethrough being mutually parallel, whereby the portion of said thin sheet intermediate the pair of slits may be resiliently displaced relative to the portions of said thin sheet outside the pair of slits, and a central aperture through said thin sheet positioned between said pair of slits, and at least one mounting portion for attachment to a relatively fixed member; and a thin sheet pointer member pivotally interconnected with said thin sheet support means and being removably retained thereto including, a body portion having an elongated aperture therein, said aperture having a longitudinal axis and generally mutually spaced parallel first and second elongated edges wherein at least one portion of said first edge being offset toward said second edge, and at least a portion of said second edge being offset toward said first edge, and a second portion of said first edge being offset toward said second edge, whereby said offset portions of said first edge engage in pivotal contact the portions of said support means outside of said slits and said portion of said second edge engage in pivotal contact the portion of said support means between the slits whereby said pointer may pivotally rotate with respect to said support means.

15. A pivotal pointer mounting as defined in claim 14 wherein:

said portion of said thin sheet support means between said pair of slits being provided with an aperture therethrough, and said portion of said second edge of said pointer member offset toward said first edge being provided with a tab extending toward said first edge but falling short thereof and being received within the aperture in said support member.

16. A pivotal pointer mounting comprising:

thin sheet supporting means for supporting a pointer member said supporting means including a first thin sheet member comprising:

a circular disc with a concentric aperture therein and a pair of inwardly directed outwardly facing opposed notches within the outer edge portion of said disc, and a pair of outwardly directed inwardly facing notches within the inner edge of said disc wherein said notches all lie in a straight line; and a second thin sheet member having a mounting portion for attachment to a relatively fixed member, and separated resilient cantilever leaves extending therefrom and an inwardly directed outwardly facing notch formed in the outer edge of each leaf for pivotal engagement with said pair of outwardly directed inwardly facing notches within the inner edge portion of said circular disc; and a thin sheet pointer member having a generally J-shaped configuration having a pair of outwardly directed inwardly facing opposed notches formed within the inner edge of the base of the pointer for pivotal engagement with said pair of inwardly directed outwardly facing opposed notches in said outer edge portion of said thin sheet.

* * * * *